US012743952B2

(12) United States Patent
Avedisov et al.

(10) Patent No.: US 12,743,952 B2
(45) Date of Patent: Sep. 22, 2026

(54) SYSTEMS AND METHODS FOR AVOIDING DEADLOCKS THROUGH VEHICLE MANEUVERS

(71) Applicant: Toyota Motor Engineering & Manufacturing North America, Inc., Plano, TX (US)

(72) Inventors: Sergei S. Avedisov, Los Gatos, CA (US); Seyhan Ucar, Mountain View, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 497 days.

(21) Appl. No.: 18/091,773

(22) Filed: Dec. 30, 2022

(65) Prior Publication Data

US 2024/0221502 A1 Jul. 4, 2024

(51) Int. Cl.
*B60W 60/00* (2020.01)
*G08G 1/0967* (2006.01)

(52) U.S. Cl.
CPC ..... *G08G 1/096725* (2013.01); *B60W 60/005* (2020.02); *B60W 2554/40* (2020.02); *B60W 2556/45* (2020.02)

(58) Field of Classification Search
CPC ............ G08G 1/096725; G08G 1/166; B60W 60/005; B60W 2554/40; B60W 2556/45
See application file for complete search history.

(56) References Cited

U.S. PATENT DOCUMENTS 10,140,859 B1 11/2018 Greenberger et al.
10,636,297 B2 4/2020 Wang et al.
(Continued)

FOREIGN PATENT DOCUMENTS

CN 113053167 A 6/2021
WO 2021092039 A1 5/2021
(Continued)

OTHER PUBLICATIONS

Aoki et al., "A-DRIVE: Autonomous Deadlock Detection and Recovery at Road Intersections for Connected and Automated Vehicles," 2022 IEEE Intelligent Vehicles Symposium (IV), pp. 29-36.

*Primary Examiner* — Ramya P Burgess
*Assistant Examiner* — Chanmin Park
(74) *Attorney, Agent, or Firm* — Christopher G. Darrow; Darrow Mustafa PC

(57) ABSTRACT

System, methods, and other embodiments described herein relate to avoiding deadlocks between vehicles through adjusted maneuvering. In one embodiment, a method includes predicting vehicle trajectories using a model generated from sensor data and information communicated to a subject vehicle. The method also includes estimating, by the subject vehicle, deadlock parameters using the vehicle trajectories. The method also includes, in response to the deadlock parameters satisfying a threshold, avoiding a deadlock by communicating a maneuver message (MM) that suggests a maneuver for nearby vehicles according to vehicle parameters or by executing a motion adjustment initiated by the subject vehicle that reduce conditions for traffic conflicts according to the deadlock parameters.

20 Claims, 9 Drawing Sheets

(56) References Cited

U.S. PATENT DOCUMENTS

| | | | | |
|---|---|---|---|---|
| 2022/0076567 | A1 | 3/2022 | Gonzalez Vazquez et al. | |
| 2022/0076568 | A1 | 3/2022 | Kwoczek et al. | |
| 2022/0089162 | A1 | 3/2022 | Ucar et al. | |
| 2022/0180749 | A1* | 6/2022 | Narushima | G08G 1/163 |
| 2022/0332350 | A1* | 10/2022 | Jha | B60W 60/0017 |

FOREIGN PATENT DOCUMENTS

| | | | |
|---|---|---|---|
| WO | 2021141770 | A1 | 7/2021 |
| WO | 2021194590 | A1 | 9/2021 |

* cited by examiner

SYSTEMS AND METHODS FOR AVOIDING DEADLOCKS THROUGH VEHICLE MANEUVERS

TECHNICAL FIELD

The subject matter described herein relates, in general, to avoiding deadlocks in driving scenarios, and, more particularly, to avoiding deadlocks between automated vehicles through adjusted maneuvering.

BACKGROUND

Vehicles use data from sensors and wireless communications to perceive other vehicles, obstacles, and additional aspects of a surrounding environment. For example, a vehicle is equipped with a light detection and ranging (LIDAR) sensor that uses light to scan the surrounding environment. Logic associated with the LIDAR analyzes acquired data to detect the presence of other vehicles. As such, the vehicle can combine the acquired data with information communicated wirelessly from other vehicles (e.g., vehicle-to-vehicle (V2V) data) for detecting the other vehicles. In one approach, the detection improves perceptions of the surrounding environment so that systems such as automated driving systems can perceive and accurately navigate a vehicle through driving scenarios.

In general, the further awareness is developed by the vehicle about a surrounding environment, the better a driver can be supplemented with information to assist in driving and avoiding conflicts (e.g., nearby vehicles, pedestrians, etc.) on a path. However, automated vehicles can encounter certain conflicts along the path that cause unreasonable delays and risk safety. For example, automated vehicles arriving at an unsignalized intersection (e.g., stop sign) at similar times can cause confusion about which vehicle has the right-of-way. Another conflict is an encounter involving automated vehicles traveling in opposite directions on a single-track road where neither may give way. Avoiding such conflicts by the automated vehicle is difficult due to perception errors, particularly during complex scenarios. Accordingly, these conflicts hamper traffic flow and increase the complexity of automated driving.

SUMMARY

In one embodiment, example systems and methods relate to a manner of avoiding deadlocks between vehicles through adjusted maneuvering. In various implementations, automated vehicles encounter conflicts with nearby vehicles involving overlapping paths. Sometimes referred to as deadlocks, these conflicts may include automated vehicles arriving at an intersection with a stop sign concurrently. Here, the automated vehicles are unable to resolve the conflict (e.g., right-of-way, turning priority, etc.) without external assistance (e.g., an operator), particularly with errors in sensor data. Therefore, in one embodiment, a prediction system uses a physical model to estimate the trajectories of nearby vehicles and avoid deadlocks. Here, the physical model can be generated from sensor data, information (e.g., a maneuver message (MM)) from connected automated vehicles (CAV), and data from connected infrastructure (CI). The prediction system estimates the deadlock parameters using the trajectories within a driving scenario. In one approach, the deadlock parameters indicate a likelihood or existence of the deadlock between automated vehicles in a driving scenario. The prediction system avoids the deadlock by transmitting a MM to a CAV that suggests a maneuver for preventing the deadlock. In various implementations, an automated vehicle implements the prediction system to adjust motion for reducing the deadlock parameters and avoiding the deadlock. Accordingly, the prediction system avoids deadlocks involving automated vehicles by adjusting a path for vehicles involved, thereby improving safety and comfort.

In one embodiment, a prediction system for avoiding deadlocks between vehicles through adjusted maneuvering is disclosed. The prediction system includes a memory including instructions that, when executed by the processor, cause the processor to predict vehicle trajectories using a model generated from sensor data and information communicated to a subject vehicle. The instructions also include instructions to estimate, by the subject vehicle, deadlock parameters using the vehicle trajectories. The instructions also include instructions to avoid, in response to the deadlock parameters satisfying a threshold, a deadlock by communicating a MM that suggests a maneuver for nearby vehicles according to vehicle parameters or by executing a motion adjustment initiated by the subject vehicle that reduces conditions for traffic conflicts according to the deadlock parameters.

In one embodiment, a non-transitory computer-readable medium for avoiding deadlocks between vehicles through adjusted maneuvering and including instructions that when executed by a processor cause the processor to perform one or more functions is disclosed. The instructions include instructions to predict vehicle trajectories using a model generated from sensor data and information communicated to a subject vehicle. The instructions also include instructions to estimate, by the subject vehicle, deadlock parameters using the vehicle trajectories. The instructions also include instructions to avoid, in response to the deadlock parameters satisfying a threshold, a deadlock by communicating a MM that suggests a maneuver for nearby vehicles according to vehicle parameters or by executing a motion adjustment initiated by the subject vehicle that reduces conditions for traffic conflicts according to the deadlock parameters.

In one embodiment, a method for avoiding deadlocks between vehicles through adjusted maneuvering is disclosed. In one embodiment, the method includes predicting vehicle trajectories using a model generated from sensor data and information communicated to a subject vehicle. The method also includes estimating, by the subject vehicle, deadlock parameters using the vehicle trajectories. The method also includes, in response to the deadlock parameters satisfying a threshold, avoiding a deadlock by communicating a MM that suggests a maneuver for nearby vehicles according to vehicle parameters or by executing a motion adjustment initiated by the subject vehicle that reduces conditions for traffic conflicts according to the deadlock parameters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with avoiding deadlocks between vehicles through adjusted maneuvering are disclosed herein. In various implementations, automated vehicles encounter conflicts that are unresolvable due to concurrent arrival. For example, automated vehicles at a four-way intersection with stop signs have overlapping arrival times and minimal time variances (e.g., a few seconds). These events are sometimes called deadlocks because they involve limited escape maneuvers and cause extended delays for traffic. Systems can avoid vehicle deadlocks, in one approach, by executing happens-before analysis that indicates a causality about a conflict between vehicles using prior knowledge of behavior. However, prior knowledge can be unavailable and happens-before analysis using unreliable data decreases robustness. Therefore, in one embodiment, a prediction system anticipates and avoids a deadlock by estimating deadlock parameters using messaging and sensor data independent of prior knowledge (e.g., traffic patterns, operator behavior, vehicle history, etc.). The prediction system can estimate the deadlock parameters using vehicle trajectories inferred from vehicle messaging. Here, vehicles communicate maneuver messages (MM), basic safety messages (BSM), and so on for traffic management and cooperation. In one approach, the deadlock parameters indicate probabilities for the deadlock between automated vehicles in a driving scenario independent of prior knowledge. In this way, the prediction system avoids a deadlock by suggesting a maneuver to a target vehicle or processing motion planning to execute an adjusted path.

In various implementations, a vehicle alters a path to mitigate a potential deadlock identified by the prediction system. Here, the path increases the spacing of arrival times for a potential confrontation involving nearby vehicles. Furthermore, the prediction system can factor vehicle parameters for altering the path by avoiding unexpected vehicles that are unconnected or operate using limited capabilities. For example, the vehicle parameters indicate limited connectivity capabilities (e.g., broadcast only) and automation levels (e.g., society of automotive engineers (SAE) levels 0-2) for nearby vehicles within a driving scenario. In one approach, a vehicle avoids the potential deadlock with nearby vehicles that lack messaging capabilities by processing local sensor data for perception and automatically adjusting a trajectory. For instance, the prediction system recommends allowing passage of the nearby vehicle through an unsignalized intersection by the vehicle slowing down. Accordingly, the prediction system mitigates deadlock using sensor data, modeling, and messaging without reliance on prior knowledge (e.g., happens-before analysis), thereby improving system robustness and safety involving diverse driving scenarios.

Figure 1:
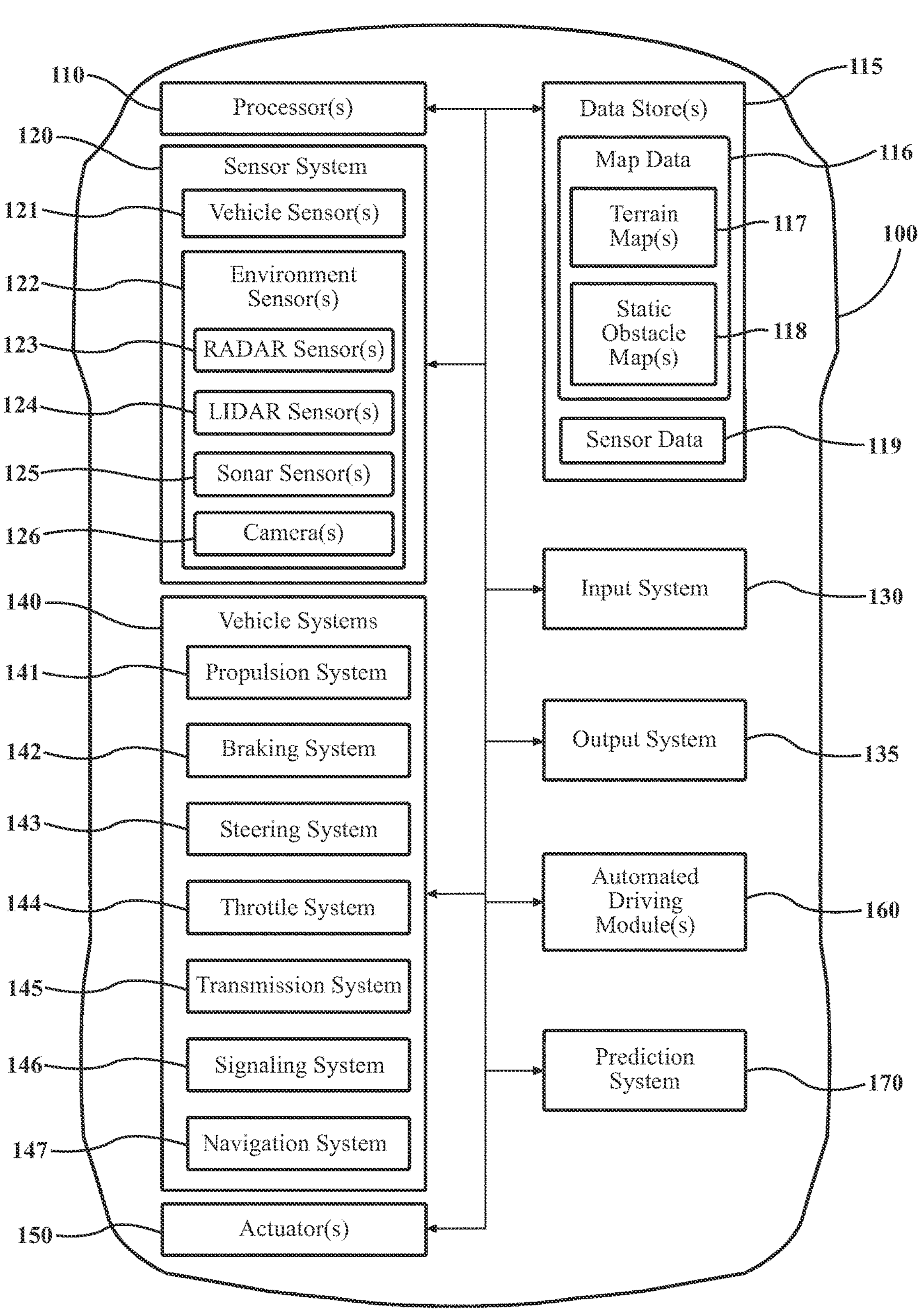
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a prediction system 170 uses road-side units (RSU), consumer electronics (CE), mobile devices, robots, drones, and so on that benefit from the functionality discussed herein associated with avoiding deadlocks between vehicles through adjusted maneuvering.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to avoiding deadlocks between vehicles through adjusted maneuvering.

Figure 2:
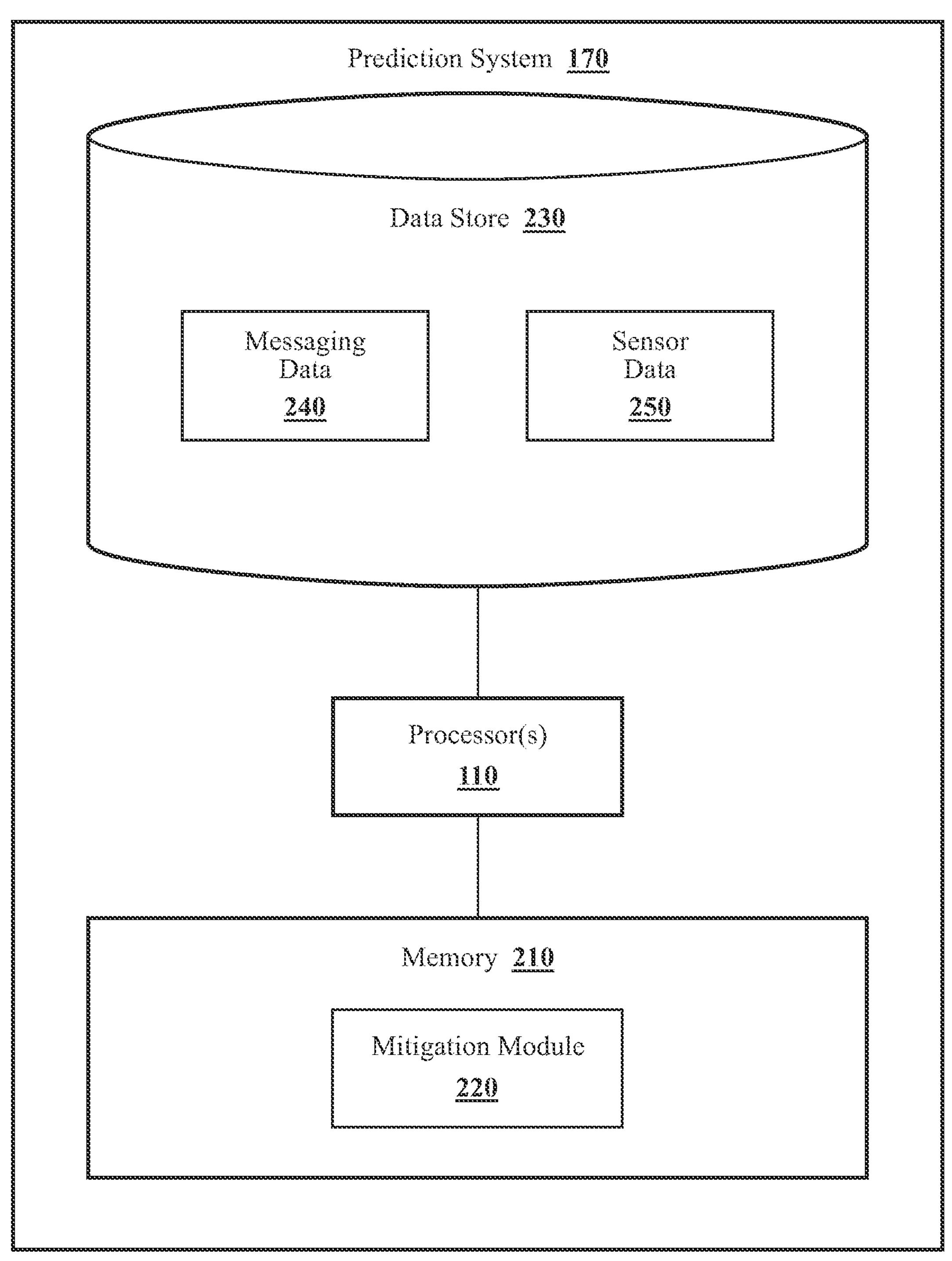
FIG. 2 illustrates one embodiment of a prediction system that is associated with avoiding deadlocks between vehicles through adjusted maneuvering and intelligent planning.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a mitigation module 220. The memory 210 is a random-access memory (RAM), a read-only memory (ROM), a hard-disk drive, a flash memory, or other suitable memory for storing the mitigation module 220. The mitigation module 220 is, for example, computer-readable instructions that when executed by the processor(s) 110 cause the processor(s) 110 to perform the various functions disclosed herein.

The prediction system 170 as illustrated in FIG. 2 is generally an abstracted form of the prediction system 170. Additionally, the mitigation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the mitigation module 220, in one embodiment, acquires the sensor data 250 that includes at least camera images used to perceive vehicles encountering potential deadlocks. In further arrangements, the mitigation module 220 acquires the sensor data 250 from further sensors such as radar sensors 123, LIDAR sensors 124, and other sensors as may be suitable for identifying vehicles and locations of the vehicles.

Accordingly, the mitigation module 220, in one embodiment, controls the respective sensors to provide the data inputs in the form of the sensor data 250. Additionally, while the mitigation module 220 is discussed as controlling the various sensors to provide the sensor data 250, in one or more embodiments, the mitigation module 220 can employ other techniques to acquire the sensor data 250 that are either active or passive. For example, the mitigation module 220 may passively sniff the sensor data 250 from a stream of electronic information provided by the various sensors to further components within the vehicle 100. Moreover, the mitigation module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the mitigation module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the messaging data 240 communicated by connected automated vehicles (CAV), vehicle-to-infrastructure (V2I) networks, vehicle-to-vehicle (V2V) networks, and so on. For example, vehicle 100 transmits a BSM having current position, speed, static information, and dynamic information.

In the examples given herein, a maneuver message (MM) is another wireless message exchanged between vehicles and infrastructure that contains future trajectories, projected trajectories, and so on. Examples of a MM include a maneuver coordination message (MCM) specified by the European Telecommunications Standards Institute (ETSI) and the maneuver sharing and coordination message (MSCM) standardized by the SAE. In one approach, vehicles broadcast MMs to improve motion coordination and planning by automated vehicles having varying capabilities.

Still referring to FIG. 2, the mitigation module 220, in one embodiment, is further configured to perform additional tasks beyond controlling the respective sensors to acquire and provide the sensor data 250. For example, the mitigation module 220 includes instructions that cause the processor(s) 110 to mitigate a deadlock within a traffic flow by communicating a MM that suggests a maneuver for nearby vehicles. In one approach, the vehicle 100 executes motion adjustments that reduce conditions for traffic conflicts, such as when nearby vehicles have limited automation capabilities (e.g., SAE automation levels 0-2) or connectivity. Here, the mitigation module 220 estimates deadlock parameters using vehicle trajectories predicted using a model generated from the sensor data 250 and the messaging data 240 for forming avoidance plans. For instance, the model is a physical model that estimates kinematics and dynamics of nearby vehicles within a driving scenario, such as a bicycle model. In this way, the prediction system 170 mitigates deadlocks independent of prior knowledge through modeling, sensor data, and vehicle messaging.

In one approach, the mitigation module 220 uses a machine learning algorithm embedded within the mitigation module 220, such as a convolutional neural network (CNN) or support vector machine (SVM), that is trained for semantic segmentation over the sensor data 250 from which further information is derived. Of course, in further aspects, the mitigation module 220 may employ different machine learning algorithms or implement different approaches for performing the associated functions, which can include deep convolutional encoder-decoder architectures, or another suitable approach that generates semantic labels for the separate object classes represented in traffic image. Whichever approach the mitigation module 220 implements, the mitigation module 220 provides an output representing probabilities of a potential deadlock for various driving scenarios (e.g., unsignaled intersection) and projected trajectories. In this way, the prediction system 170 mitigates deadlocks by reliably executing evasive actions according to the driving scenarios and probabilities.

Figure 3:
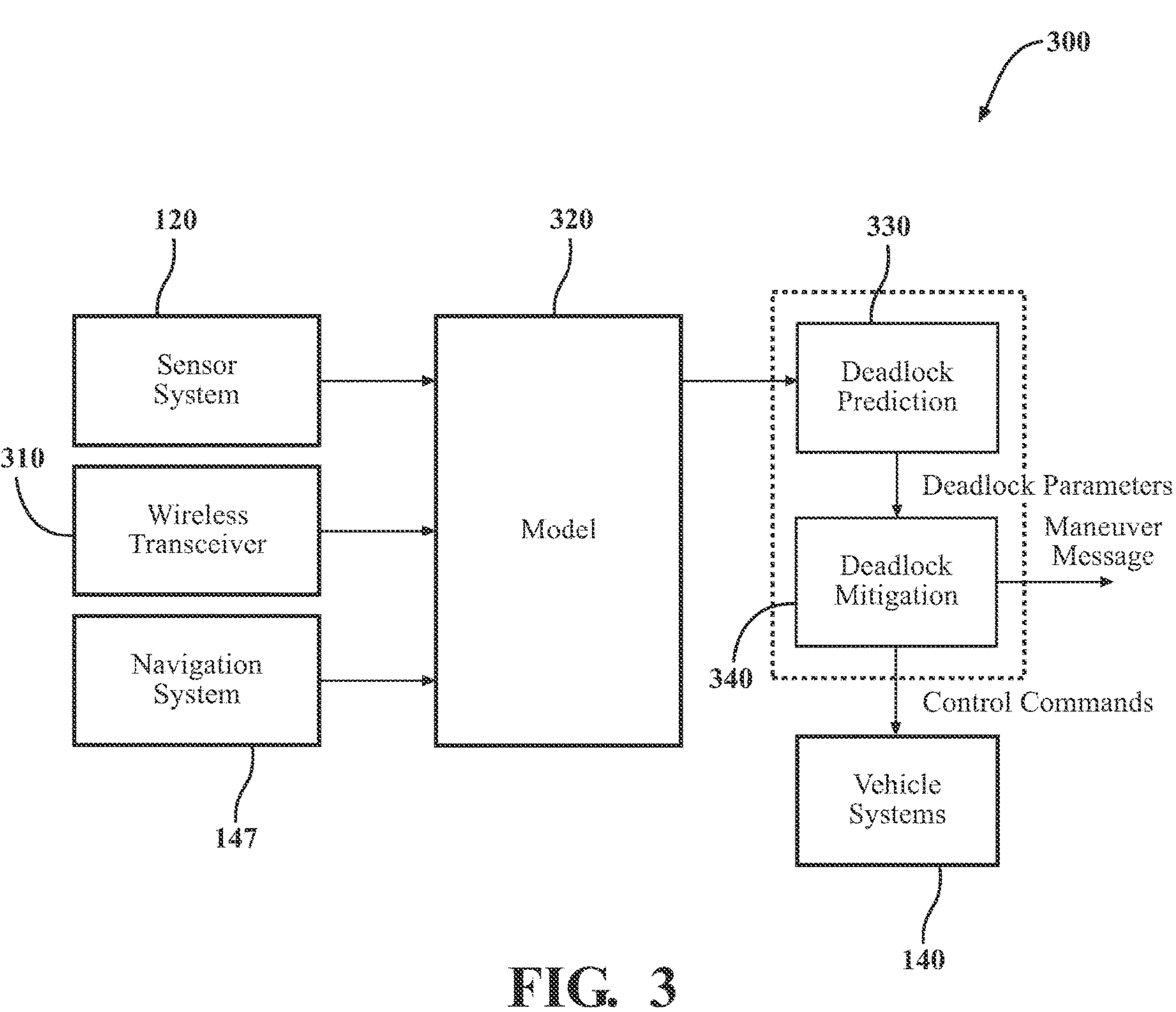
FIG. 3 illustrates one embodiment of the prediction system of FIG. 2 using a model and deadlock predictions to mitigate traffic conflicts.

Turning now to FIG. 3, one embodiment of the prediction system 170 implementing a model and deadlock predictions 300 to mitigate traffic conflicts is illustrated. The prediction system 170 can identify deadlocks involving vehicles on the road in several ways. In one approach, the prediction system 170 receives MMs through the wireless transceiver(s) 310 for encounters involving CAVs and estimates potential deadlocks accordingly. Although packet loss from communicating MMs can cause errors, here motion uncertainty leading to a deadlock is reduced by modeling forthcoming encounters. For driving scenarios involving vehicles having limited capabilities (e.g., SAE automation levels 0-2) and CAVs, the prediction system 170 can identify potential deadlocks using the sensor data 250. In this case, the probability of a potential deadlock is associated with motion uncertainty of CAVs, sensor errors, and packet loss. However, the prediction system 170 can reduce perception and data errors through Kalman filtering that accounts for errors in future states of vehicles, thereby improving system performance.

Regarding the model 320, the prediction system 170 models trajectories using data from the sensor system 120, the messaging data 240, and positions of the vehicle 100 outputted by the navigation system 147. As previously explained, the model may be a bicycle model that estimates kinematics and dynamic states of the vehicle 100 and nearby vehicles within a driving scenario. A bicycle model takes four-wheel representations of the vehicle 100 but combines the front and rear wheels that translate into a two-wheeled model within a two-dimensional (2D) plane. The bicycle model assumes the vehicle 100 has a lumped center-of-mass and limited slipping (e.g., lateral/longitudinal slip in the tires) to generate equations describing modeling at any time point. Thus, the model factors two wheels and one steering angle instead of four wheels and two steering angles, thereby simplifying computations.

In various implementations, the deadlock prediction 330 receives estimated trajectories of the vehicle 100 and the nearby vehicles for predicting a potential deadlock. For example, the deadlock prediction 330 outputs one of parameters [Yes—Deadlock; No—Deadlock; Likelihood of Deadlock]. Here, a likelihood of a potential deadlock represents that the vehicle 100 or the nearby vehicles will likely inhibit traffic flow in a driving scenario (e.g., intersection crossing). In one approach, a potential deadlock is likely when arrival times are within a time range depending on speed, direction, time, and so on.

Moreover, the deadlock mitigation 340 processes deadlock parameters and communicates a MM to a nearby vehicle capable of receiving and automatically avoiding a potential deadlock through evasive maneuvers. In one approach, the deadlock mitigation 340 can also mitigate the potential deadlock by changing a path of the vehicle 100 using a control command(s) to one or more vehicle systems 140. Here, the path increases the spacing of arrival times for the vehicle 100 and nearby vehicles in a zone near the potential deadlock. As explained below, the deadlock mitigation 340 can select a MM or a control command when vehicle parameters satisfy criteria. For example, the vehicle parameters represent connectivity capabilities and automation levels for the vehicle 100 and the nearby vehicles within a driving scenario.

Figure 4A:
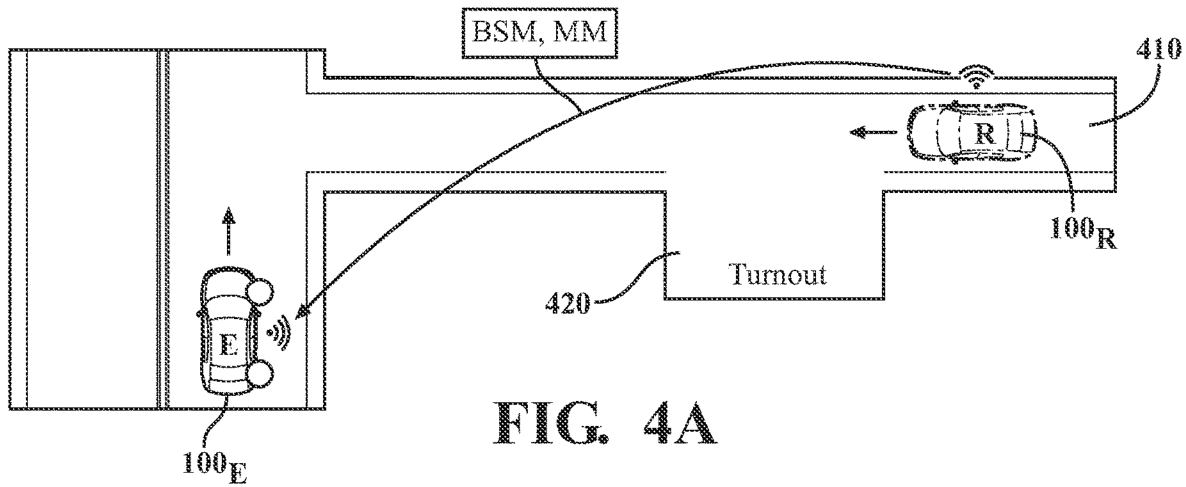
FIGS. 4A-4C illustrate examples of the prediction system using vehicle communications and cooperative maneuvering to avoid the deadlock.
Figure 4B:
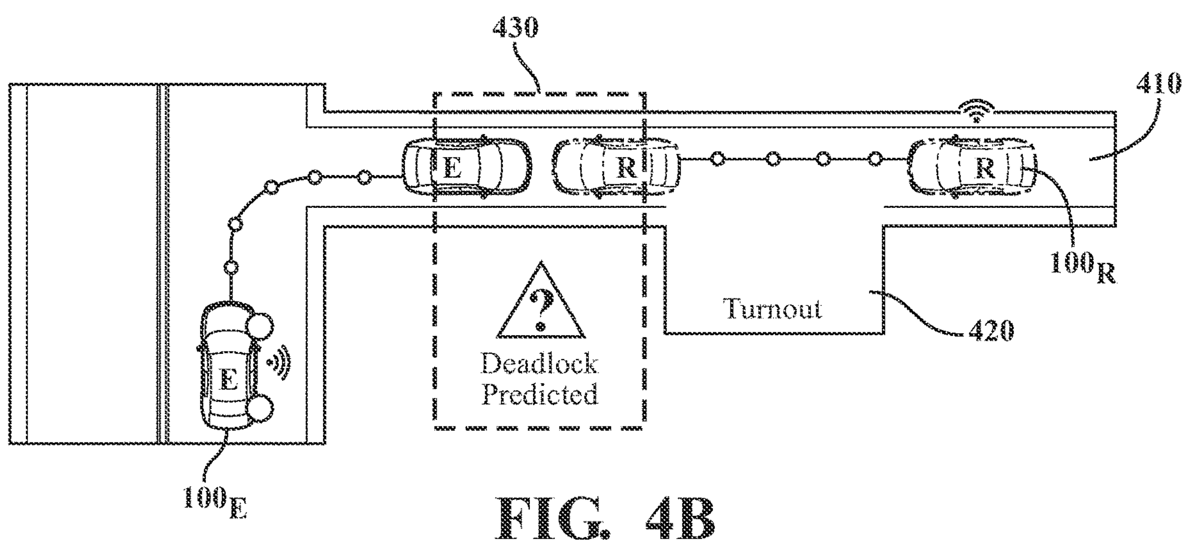
Figure 4C:
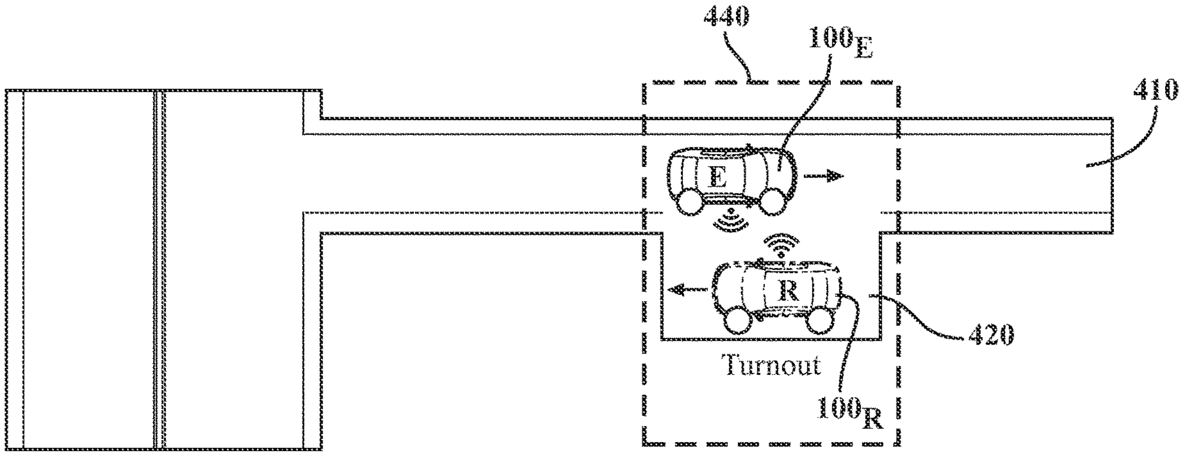

Regarding FIGS. 4A-4C, examples of the prediction system 170 using vehicle communications and cooperative maneuvering to avoid potential deadlocks are illustrated. In FIG. 4A, the vehicle 100$_E$ (e.g., an ego vehicle) plans on making a right turn onto a single-track road 410. Although certain examples are given to single-track roads, the vehicle 100$_E$ can encounter deadlocks on any lane configurations such as multi-lane roads involving blocking vehicles, atypical traffic patterns, and so on. Deadlocks are also prevalent in driving scenarios associated with parking lots and street parking where lanes are narrow. Here, the vehicle 100$_R$ (e.g., a remote vehicle) is traveling on the single-track road 410 westward that includes a turnout 420 for allowing vehicle passage. The vehicle 100$_E$ and the vehicle 100$_R$ are connected vehicles, thereby allowing MM and BSM communications. In FIG. 4B, the deadlock prediction 330 estimates a potential deadlock 430 forthcoming between the vehicle 100$_E$ and the vehicle 100$_R$ according to the received MMs and BSMs. For example, the estimates identify overlapping trajectories from MMs indicating whether the vehicle 100$_R$ will exit the single-track road 410 before the vehicle 100$_E$ enters or a vehicle takes the turnout 420. The trajectories can also indicate that the vehicle 100$_E$ will slow down or brake for mitigating potential deadlocks by allowing the vehicle 100$_R$ to exit the single-track road 410 before a conflict.

In FIG. 4C, the prediction system 170 facilitates transmission of an MM or MCM requesting that the vehicle 100$_R$ enter the turnout 420. Here, the vehicle 100$_R$ is an automated vehicle operating at level 3 (L3) and above that automatically maneuvers into the turnout 420 with limited operator assistance. In one approach, the vehicle 100$_R$ responds with a MM confirming the request as part of a negotiation with the vehicle 100$_E$. In this way, the vehicle 100$_E$ can automatically pass 440 and the potential deadlock 430 is avoided with limited operator intervention. Accordingly, the prediction system 170 mitigates potential deadlocks through vehicle messaging and automated maneuvers while limiting operator assistance.

Figure 5A:
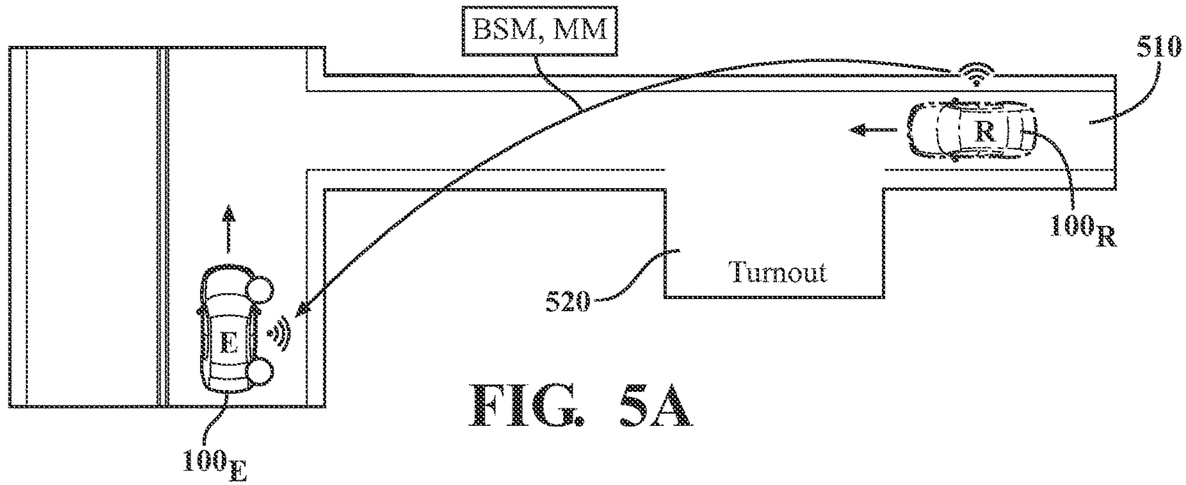
FIGS. 5A-5C illustrate examples of the prediction system avoiding a deadlock at an intersection between vehicles through maneuver messaging (MM).
Figure 5B:
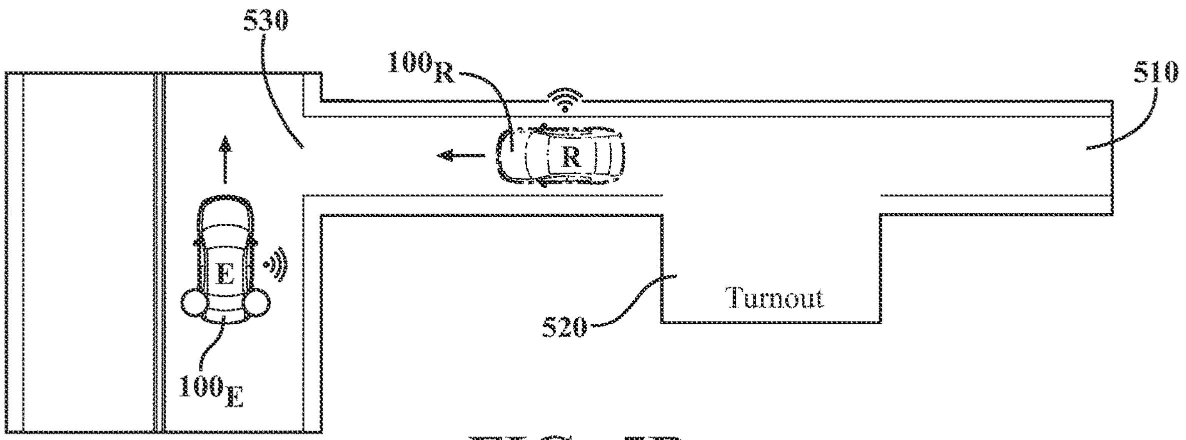
Figure 5C:
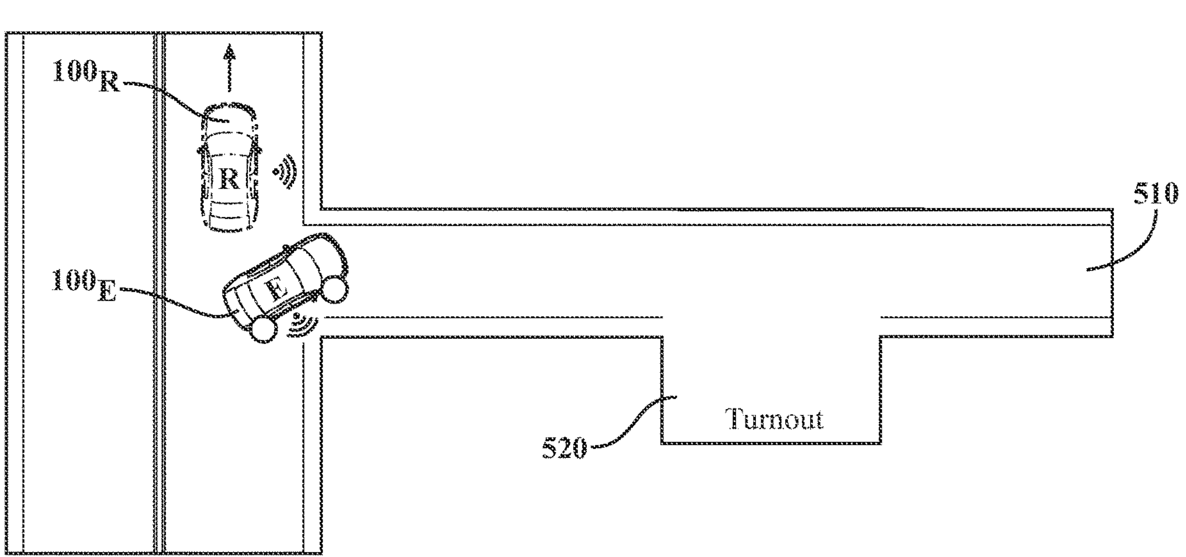

FIGS. 5A-5C illustrate examples of the prediction system 170 avoiding a potential deadlock at an intersection between vehicles through MMs. In FIG. 5A, the vehicle 100$_E$ plans a right turn onto the single-track road 510 having the vehicle 100$_R$ traveling westward. The single-track road 510 has a turnout 520 available for vehicle passage. Similar to the prior example, the vehicles 100$_E$ and 100$_R$ are connected vehicles, thereby allowing communications of MMs and BSMs. However, here the vehicles 100$_E$ and 100$_R$ communicate an intent MM(s) that indicates a maneuver instead of automatically following suggestions from other vehicles. In FIG. 5B, the deadlock prediction 330 estimates a potential deadlock forthcoming between the vehicle 100$_E$ and the vehicle 100$_R$ by projecting overlapping trajectories according to the received intent MMs and BSMs. In this driving scenario, the prediction system 170 estimates from a MM whether the vehicle 100$_R$ will exit the single-track road 510 before the vehicle 100$_E$ enters the road or the vehicle 100$_E$ takes the turnout 520. Furthermore, the trajectories can also indicate that the vehicle 100$_E$ will slow down and mitigate potential deadlocks by allowing the vehicle 100$_R$ to exit the single-track road 410.

In various implementations, the vehicle 100$_R$ is operating below level 3 in FIG. 5A. As such, the prediction system 170 foregoes maneuver negotiation since automatic avoidance of the deadlock is likely unavailable. Instead, the vehicle 100$_E$ may slow down to let the vehicle 100$_R$ exit the single-track road 510 and resolve the potential deadlock through the driving maneuvers 530. The vehicle 100$_E$ turns onto the single-track road 510 once the vehicle 100$_R$ exits. Accordingly, the prediction system 170 can avoid the potential deadlock using intent messaging and limited automation.

Figure 6A:
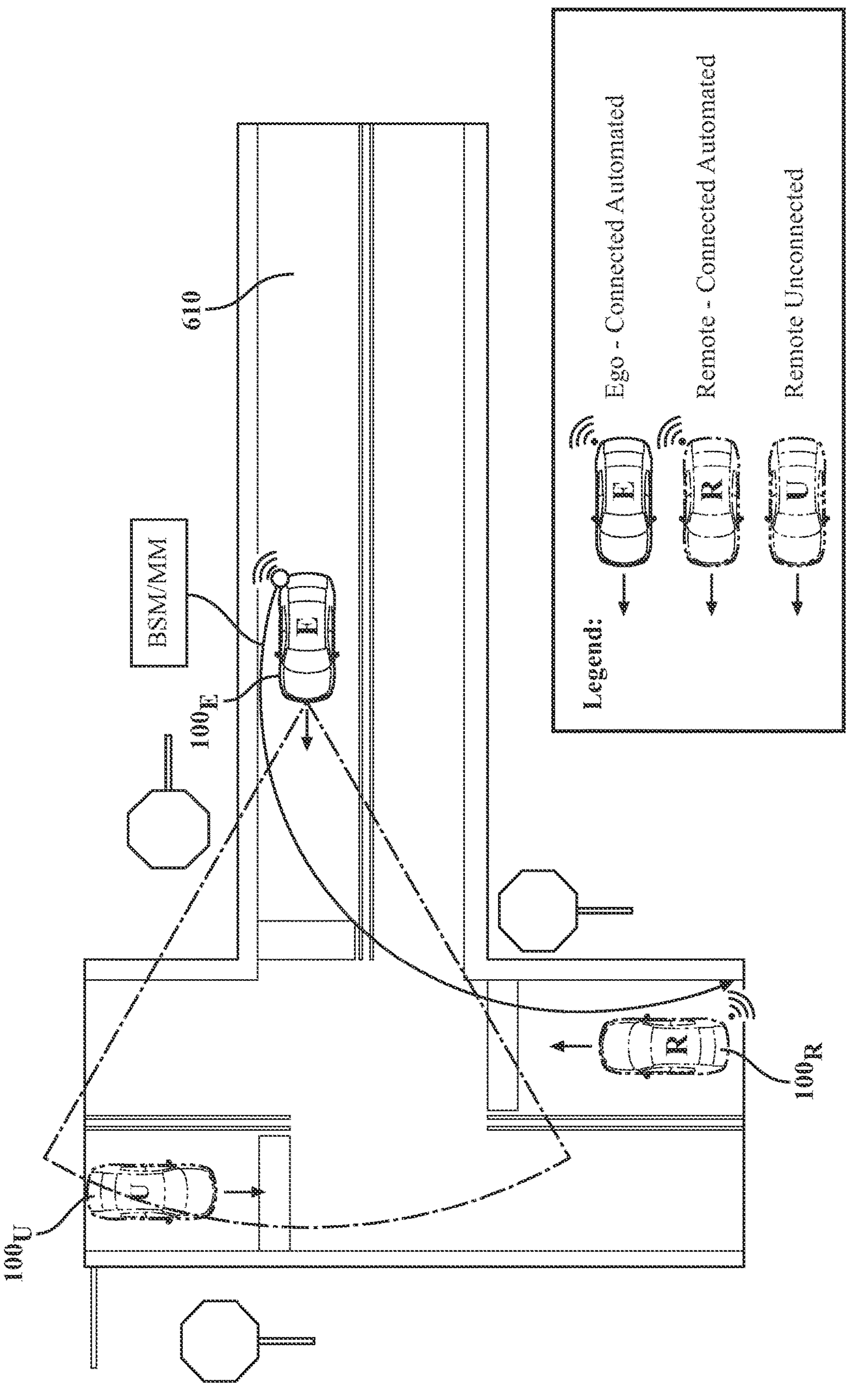
FIGS. 6A-6C illustrate examples of avoiding deadlock at unsignalized intersections by the prediction system estimating arrival times.
Figure 6B:
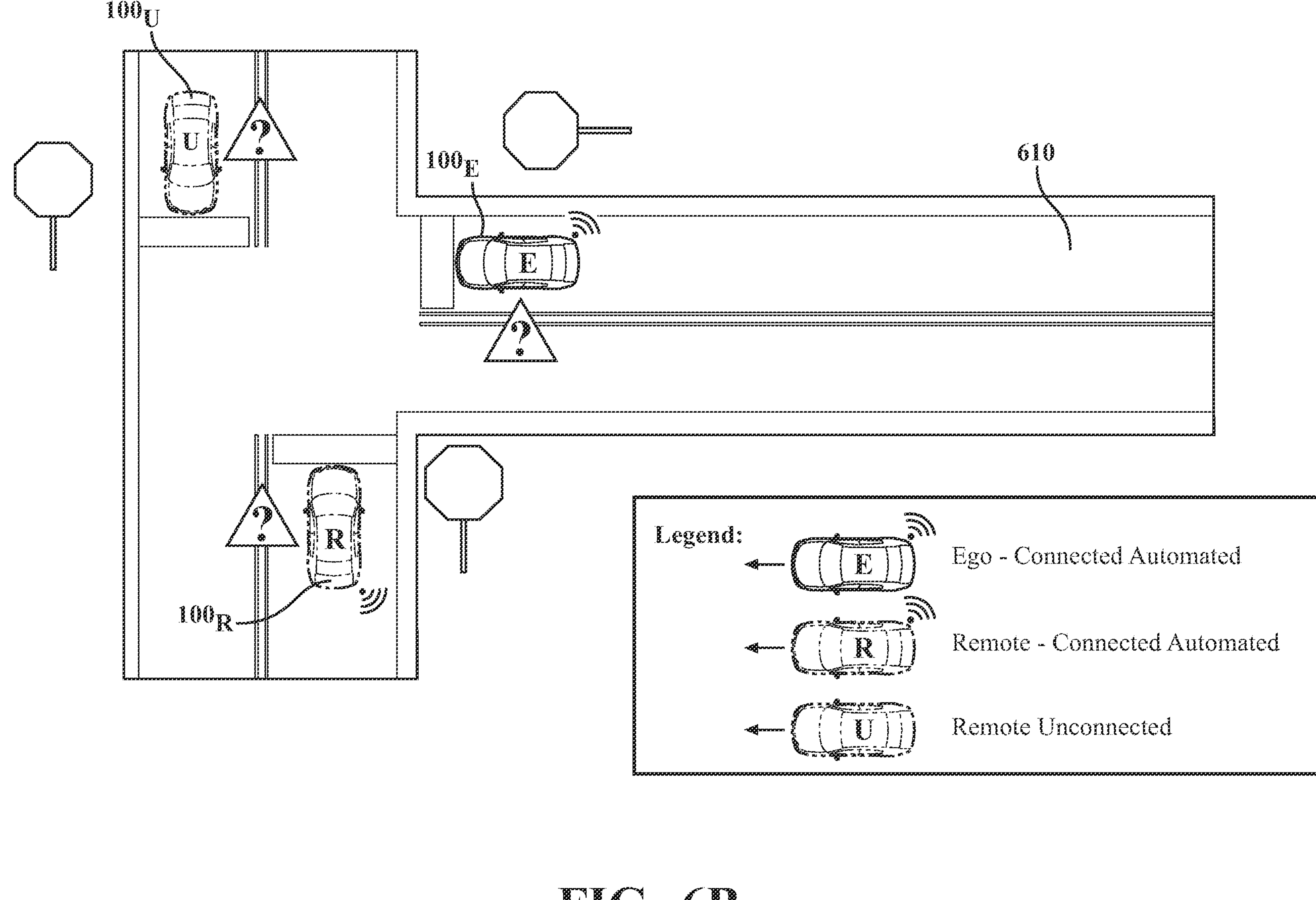
Figure 6C:
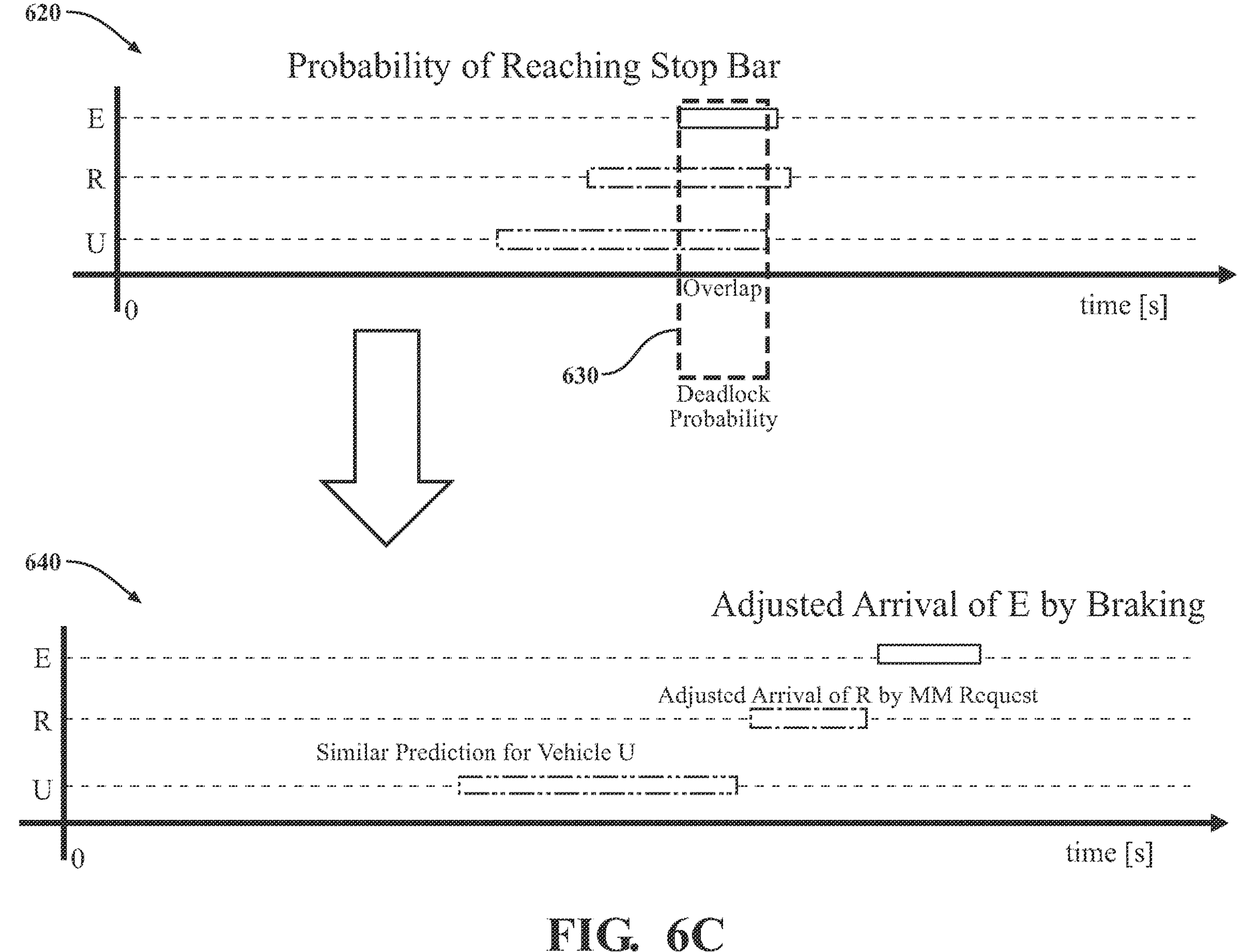

FIGS. 6A-6C illustrate examples of avoiding deadlock at unsignalized intersections by the prediction system 170 estimating arrival times. In FIG. 6A, the vehicle 100$_E$, the vehicle 100$_R$, and the vehicle 100$_U$ are approaching an unsignalized intersection (e.g., four-way stops) on a two-way road 610 concurrently. Although the examples given include three vehicles, any number of vehicles may encounter a deadlock involving fully or partially automated vehicles. In particular, the vehicle 100$_R$ may be a CAV whereas the vehicle 100$_U$ is an unconnected vehicle. Here, the vehicle 100$_E$ detects that the vehicle 100$_U$ is unconnected by perception processing of the sensor data 250. Furthermore, the vehicle 100$_E$ acquires state and compatibility information about the vehicle 100$_R$ using BSM and MM messaging. In FIG. 6B, the prediction system 170 estimates a deadlock because of confusion about the right-of-way at the unsignalized intersection when certain vehicles arrive concurrently.

Regarding analyzing arrival times to mitigate potential deadlocks, FIG. 6C illustrates a timeline 620 involving the vehicles 100$_E$, 100$_R$, and 100$_U$. Here, the prediction system 170 estimates a potential deadlock 630 between these vehicles when they arrive at a stop bar for the unsignalized intersection. In one approach, the prediction system 170 estimates an elevated probability for the deadlock when the overlap period of arrival is above a threshold (e.g., 10 seconds). As such, the deadlock mitigation 340 of the vehicle $\mathbf{100}_E$ can generate a control command(s) that adjusts motion for avoiding the potential deadlock 630. For example, the vehicle $\mathbf{100}_E$ brakes to arrive later at the stop bar, thereby preventing right-of-way confusion from concurrent arrivals. The vehicle $\mathbf{100}_E$ may also transmit a MM to other connected vehicles (e.g., the vehicle $\mathbf{100}_R$) and request trajectory changes (e.g., slowing down) that prevents overlap in time and trajectories. Accordingly, the prediction system 170 spreads out arrival times in timeline 640 for avoiding the potential deadlock 630 by allowing the vehicle $\mathbf{100}_U$ to arrive first.

In various implementations, the prediction system 170 follows a multi-layer hierarchy for right-of-way that mitigates maneuver confusion at intersections for automated vehicles. For example, the prediction system 170 factors vehicle types at a first layer such that suggested maneuvers for L3 vehicles are prioritized over level 2 (L2) vehicles. Furthermore, another layer in the hierarchy gives emergency vehicles priority over sedans in the area. Of course, the prediction system 170 can combine hierarchical levels for decision-making by vehicle type and automation level for avoiding a deadlock. In this way, the prediction system 170 reduces the confusion that causes deadlock robustly by accounting for diverse driving scenarios through a hierarchical order.

Figure 7:
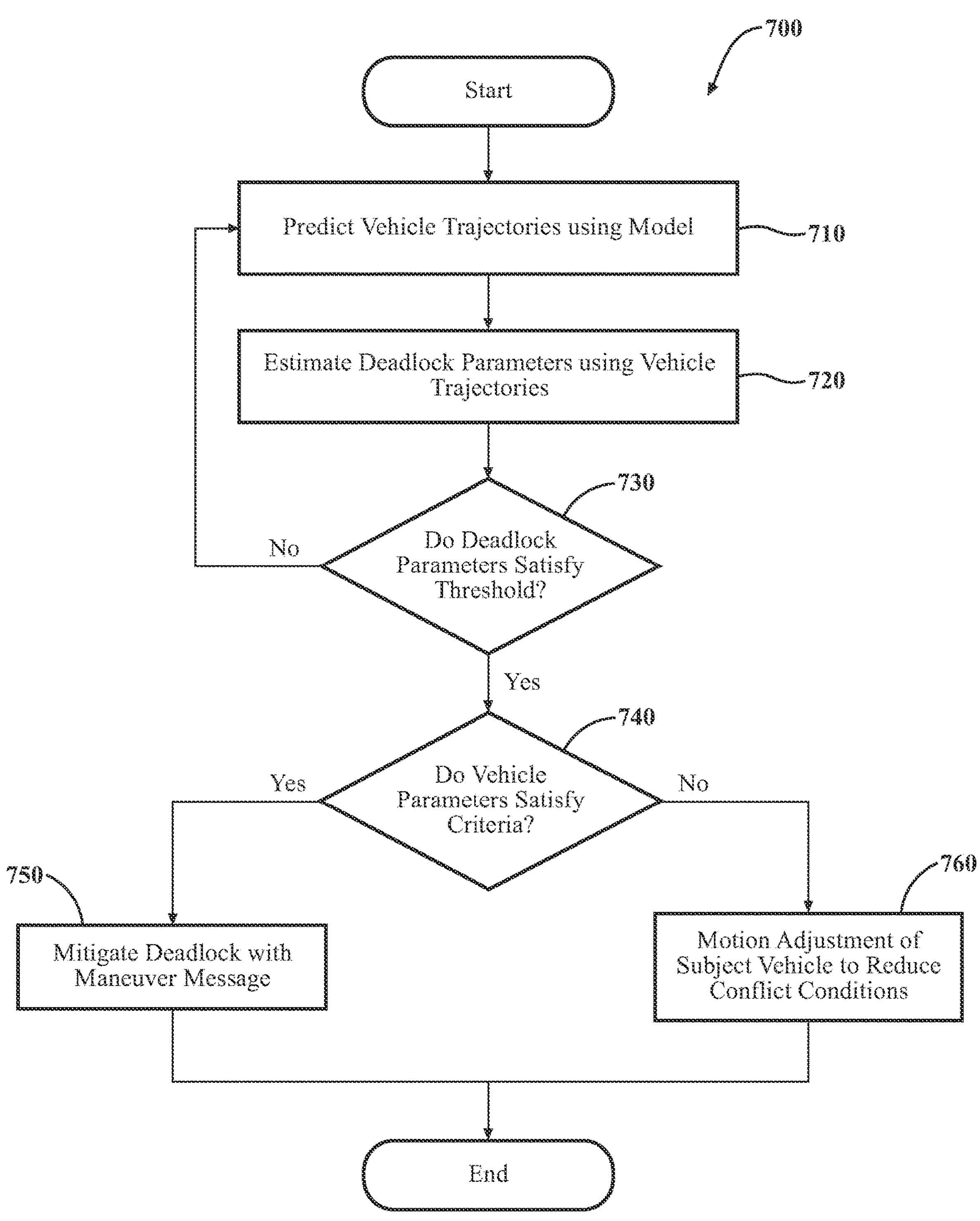
FIG. 7 illustrates one embodiment of a method that is associated with estimating deadlock parameters and avoiding a deadlock by the prediction system.

Turning now to FIG. 7, a flowchart of a method 700 that is associated with estimating deadlock parameters and avoiding a potential deadlock by the prediction system 170 is illustrated. Method 700 will be discussed from the perspective of the prediction system 170 of FIGS. 1 and 2. While method 700 is discussed in combination with the prediction system 170, it should be appreciated that the method 700 is not limited to being implemented within the prediction system 170 but is instead one example of a system that may implement the method 700.

At 710, the prediction system 170 predicts trajectories using a model generated from the sensor data 250 and communicated information to the vehicle 100. Here, the trajectories are associated with the vehicle 100 and nearby vehicles that create a potential deadlock from overlapping arrival times or paths. The communicated information may be the messaging data 240 (e.g., MM, BSM, etc.) communicated between vehicles. In one approach, the model is a physical model that estimates kinematics and dynamics of nearby vehicles within a driving scenario. For simplification, the physical model uses a bicycle model that factors two wheels and one steering angle instead of four wheels and two steering angles involving trajectory computations. As previously explained, the prediction system 170 mitigates potential deadlocks independent of prior knowledge through physical modeling, the sensor data 250, and vehicle messaging.

At 720, the prediction system 170 estimates deadlock parameters using the trajectories. Here, in at least one approach, the deadlock parameters are estimated independent of a happens-before analysis that indicates the causality of a conflict between the vehicle 100 and nearby vehicles using prior vehicle behavior. As such, the prediction system 170 improves robustness since prior knowledge can be unavailable and behaviors change. Furthermore, the deadlock parameters indicate probabilities for the potential deadlock between automated vehicles independent of the prior knowledge. For example, the parameter values include [Yes—Deadlock; No—Deadlock; Likelihood of Deadlock]. As explained above, a likelihood of the potential deadlock represents that the vehicle 100 or the nearby vehicles will likely inhibit traffic flow in a driving scenario (e.g., intersection crossing). As previously explained, the potential deadlock is likely when arrival times are within a time range depending on speed, time, direction, and so on. This is illustrated by the potential deadlock 630 where three vehicles have substantially overlapping time-of-arrivals at an unsignalized intersection.

At 730, the mitigation module 220 determines whether the deadlock parameters satisfy a threshold. For example, the threshold is a distance, velocity, or time parameter that indicates the vehicle 100 will encounter disruptions by nearby vehicles in a path associated with the traffic flow. In one approach, the threshold is an overlap of arrival periods (e.g., 10 seconds) between the vehicle 100 and a remote vehicle (e.g., ado vehicle) utilizing a single-track road. The prediction system 170 calculates additional trajectories using the model when the threshold is unsatisfied. Thus, a travel disruption to the vehicle 100 by the potential deadlock is unlikely under the current conditions.

At 740, the mitigation module 220 determines and compares vehicle parameters to criteria associated with connectivity, automation levels, and so on involving nearby vehicles. The automation levels (e.g., SAE 1-5) indicate the automatic maneuverability of the nearby vehicles with varying operator intervention. Regarding connectivity, the mitigation module 220 uses messaging to suggest or receive maneuvers involving both connected vehicles. The prediction system 170 combines information from messaging communications with connected vehicles and the sensor data 250 for unconnected vehicles to compute solutions for the potential deadlock. The solution can be having nearby vehicles perform maneuvers (e.g., automatic, partially automatic, and so on) or adjusting motion of the vehicle 100 for avoiding the potential deadlock.

At 750, the mitigation module 220 transmits a MM that mitigates the potential deadlock when the target vehicle is a CAV. Here, the vehicle 100 and nearby CAV using certain automation levels (e.g., L3 and above) automatically negotiate maneuvers and routing that avoids the potential deadlock. For example, the CAV automatically changes lanes, pulls into a turnout, slows down, and so on according to instructions from the MM, thereby mitigating the potential deadlock. In one approach, the vehicle 100 also changes motion (e.g., slows down, increases speeds, and so on) when timing and position of nearby vehicles for the potential deadlock indicate unlikely mitigation. Here, the nearby vehicles are incapable of maneuver negotiation due to automation level, operator experience, and so on. Accordingly, the prediction system 170 communicates intent MMs so that vehicles involved in the potential deadlock are aware of the mitigation and notify operators accordingly, thereby improving safety and comfort.

At 760, the mitigation module 220 reduces conflict conditions with a motion adjustment of the vehicle 100. Here, the potential deadlock may involve connected and unconnected vehicles that are confused about the right-of-way in a driving scenario. The vehicle 100 detects that a nearby vehicle is unconnected by perception processing of the sensor data 250. Furthermore, the vehicle 100 acquires state and compatibility information about other nearby vehicles involving the potential deadlock using connected messaging. As such, the mitigation module 220 of the vehicle 100 can generate a control command(s) that adjusts motion for avoiding the potential deadlock. For example, the vehicle 100 brakes to arrive later at a conflict point, thereby preventing right-of-way confusion from concurrent arrivals.

The vehicle 100 can also transmit a MM to other connected vehicles and request trajectory changes (e.g., slowing down). Accordingly, the prediction system 170 spreads out arrival times that avoid the potential deadlock by allowing unconnected vehicles to arrive first, thereby improving traffic flow and comfort for road agents.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the SAE levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-7 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system comprising:
- a processor; and
- a memory storing instructions that, when executed by the processor, cause the processor to:
  - predict vehicle trajectories for a connected vehicle and an unconnected vehicle using a model that is generated from sensor data of a subject vehicle and information communicated to the subject vehicle;
  - estimate, by the subject vehicle, deadlock parameters using the vehicle trajectories outputted from the model, and the deadlock parameters including a likelihood about the vehicle trajectories overlapping in arrival times at an intersection independent of prior knowledge about the unconnected vehicle; and
  - in response to the deadlock parameters satisfying a threshold for the arrival times, avoid a deadlock by communicating a maneuver message (MM) for an automated maneuver by the connected vehicle according to vehicle parameters, or execute a motion adjustment automatically by the subject vehicle that reduces traffic conflicts according to the deadlock parameters and increases spacing of the arrival times at the intersection between the subject vehicle and the unconnected vehicle.

2. The prediction system of claim 1, wherein the instructions to avoid the deadlock further include instructions to mitigate the deadlock by changing a path of the subject vehicle, wherein the path increases spacing of the arrival times for the subject vehicle and the connected vehicle associated with a location.

3. The prediction system of claim 1, wherein the instructions to avoid the deadlock further include instructions to mitigate, in response to the vehicle parameters satisfying criteria, the deadlock by changing a path of the subject vehicle, wherein the vehicle parameters represent connectivity capabilities and automation levels for the subject vehicle, the connected vehicle that is automated, and the unconnected vehicle within a driving scenario.

4. The prediction system of claim 3, wherein the instructions to avoid the deadlock further include instructions to resolve, by the subject vehicle, the deadlock with the unconnected vehicle by directly communicating a basic safety message (BSM) or the MM to the connected vehicle and the connected vehicle changes a current path.

5. The prediction system of claim 1, wherein the instructions to estimate the deadlock parameters further include instructions to compute the deadlock parameters independent of a happens-before analysis associated with the prior knowledge, wherein the happens-before analysis indicates causality of a conflict between the subject vehicle and the unconnected vehicle.

6. The prediction system of claim 1, wherein the model is a physical model that estimates kinematics of the connected vehicle and the unconnected vehicle within a driving scenario.

7. The prediction system of claim 1, wherein the deadlock parameters indicate an existence of the deadlock between vehicles in a driving scenario, and wherein the deadlock inhibits traffic flow between the subject vehicle and a target vehicle.

8. The prediction system of claim 1, wherein the information communicated is a broadcasted MM from the connected vehicle.

9. The prediction system of claim 1, wherein the threshold is associated with the deadlock parameters indicating that the subject vehicle will encounter disruptions by the connected vehicle and the unconnected vehicle in a path associated with traffic flow.

10. A non-transitory computer-readable medium comprising:
- instructions that when executed by a processor cause the processor to:
- predict vehicle trajectories for a connected vehicle and an unconnected vehicle using a model that is generated from sensor data of a subject vehicle and information communicated to the subject vehicle;
- estimate, by the subject vehicle, deadlock parameters using the vehicle trajectories outputted from the model, and the deadlock parameters including a likelihood about the vehicle trajectories overlapping in arrival times at an intersection independent of prior knowledge about the unconnected vehicle; and in response to the deadlock parameters satisfying a threshold for the arrival times, avoid a deadlock by communicating a maneuver message (MM) for an automated maneuver by the connected vehicle according to vehicle parameters, or execute a motion adjustment automatically by the subject vehicle that reduces traffic conflicts according to the deadlock parameters and increases spacing of the arrival times at the intersection between the subject vehicle and the unconnected vehicle.

11. The non-transitory computer-readable medium of claim 10, wherein the instructions to avoid the deadlock further include instructions to mitigate the deadlock by changing a path of the subject vehicle, wherein the path increases spacing of the arrival times for the subject vehicle and the connected vehicle associated with a location.

12. A method comprising:

predicting vehicle trajectories for a connected vehicle and an unconnected vehicle using a model that is generated from sensor data of a subject vehicle and information communicated to the subject vehicle;

estimating, by the subject vehicle, deadlock parameters using the vehicle trajectories outputted from the model, and the deadlock parameters including a likelihood about the vehicle trajectories overlapping in arrival times at an intersection independent of prior knowledge about the unconnected vehicle; and in response to the deadlock parameters satisfying a threshold for the arrival times, avoiding a deadlock by communicating a maneuver message (MM) for an automated maneuver by the connected vehicle according to vehicle parameters, or by executing a motion adjustment automatically by the subject vehicle that reduces traffic conflicts according to the deadlock parameters and increases spacing of the arrival times at the intersection between the subject vehicle and the unconnected vehicle.

13. The method of claim 12, wherein avoiding the deadlock further includes mitigating the deadlock by changing a path of the subject vehicle, wherein the path increases spacing of the arrival times for the subject vehicle and the connected vehicle associated with a location.

14. The method of claim 12, wherein avoiding the deadlock further includes mitigating, in response to the vehicle parameters satisfying criteria, the deadlock by changing a path of the subject vehicle, wherein the vehicle parameters represent connectivity capabilities and automation levels for the subject vehicle, the connected vehicle that is automated, and the unconnected vehicle within a driving scenario.

15. The method of claim 14, wherein avoiding the deadlock further includes resolving, by the subject vehicle, the deadlock with the unconnected vehicle by directly communicating a basic safety message (BSM) or the MM to the connected vehicle and the connected vehicle changes a current path.

16. The method of claim 12, wherein estimating the deadlock parameters further includes computing the deadlock parameters independent of a happens-before analysis associated with the prior knowledge, wherein the happens-before analysis indicates causality of a conflict between the subject vehicle and the unconnected vehicle.

17. The method of claim 12, wherein the model is a physical model that estimates kinematics of the connected vehicle and the unconnected vehicle within a driving scenario.

18. The method of claim 12, wherein the deadlock parameters indicate an existence of the deadlock between vehicles in a driving scenario, and wherein the deadlock inhibits traffic flow between the subject vehicle and a target vehicle.

19. The method of claim 12, wherein the information communicated is a broadcasted MM from the connected vehicle.

20. The method of claim 12, wherein the threshold is associated with the deadlock parameters indicating that the subject vehicle will encounter disruptions by the connected vehicle and the unconnected vehicle in a path associated with traffic flow.

* * * * *